Patented Aug. 10, 1948

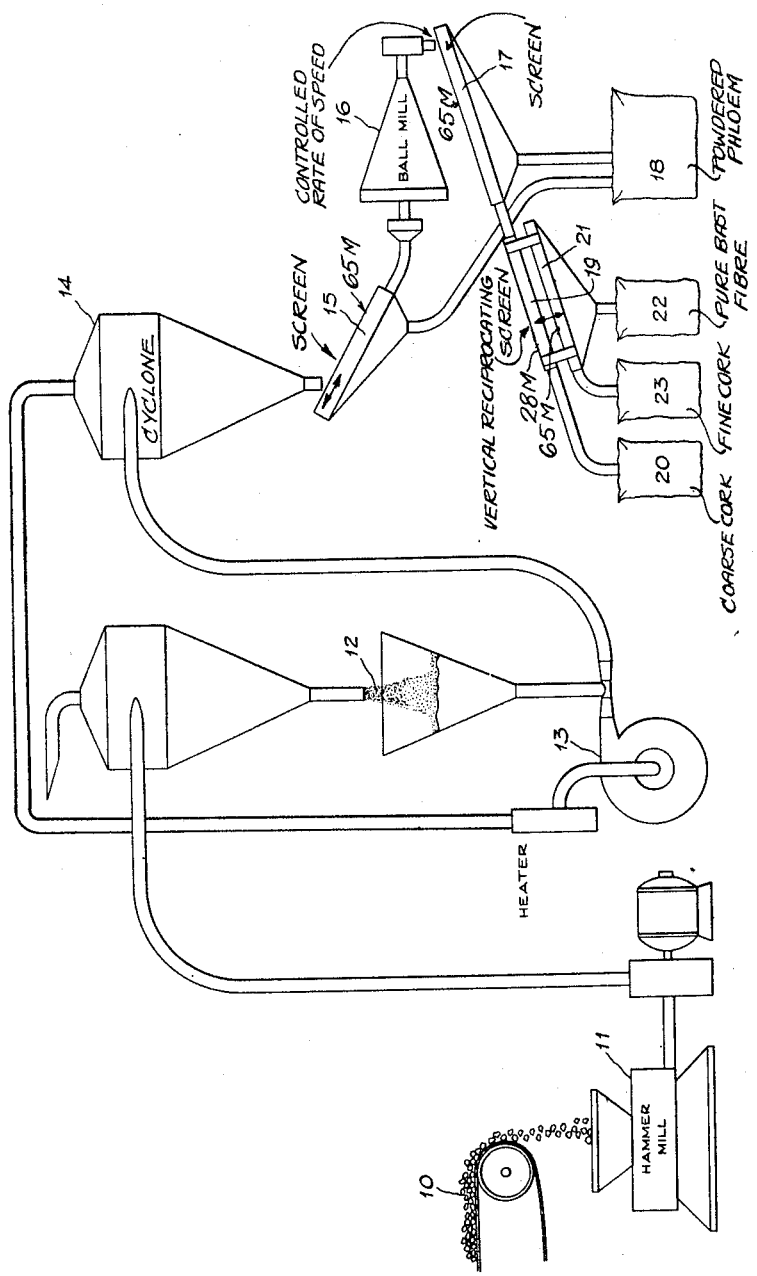

2,446,551

UNITED STATES PATENT OFFICE 2,446,551

SEPARATION OF PURE BARK FIBER FROM FINELY COMMINUTED BARK

Robert D. Pauley, Longview, Wash., assignor to Weyerhaeuser Timber Company, Longview, Wash., a corporation of Washington Application October 19, 1945, Serial No. 623,251

7 Claims. (Cl. 209—235)

This invention relates to the treatment of bark and has particular reference to an improved method of treating Douglas fir bark to produce a substantially pure and clean bark fiber fraction.

In general, the barks of trees comprise phelloderm, phellem or cork, and phloem which consists of a collection of sieve tubes and parenchyma, and frequently bast fibers or stone cells. Pieces of bark from trees show a wide variation of relative amounts of cork and phloem grading from pieces consisting almost entirely of phloem and having but thin lunes of cork to those consisting of large masses of phellem or cork with small islands of phloem existing in the cork. Microscopically, the phellem or cork is composed of layers of non-elongated suberized cells partially filled with air and of low specific gravity. The constituents of the phloem are longitudinal cells comprising sieve tubes, frequently bast fibers or stone cells, phloem parenchyma, and radial cells comprising ray parenchyma.

It has been discovered that by adjusting the friability of the bark matrix, a suitable comminuting process such as ball milling may be employed to differentially pulverize the constituents of the bark to break the bond therebetween and so permit separation thereof by selective screening. Such separation is productive of various classes of materials, each of which may be recovered as a fraction substantially free from mixture or contamination.

The first of these materials is the phellem or cork developed each year by the phellogen or cork cambium. The phellem or cork consists of nonelongated thin and thick walled cells converted into cork tissue by development of suberin. The thin walled cells probably are not heavily suberized and tend to collapse in the radial direction. The cork cells are partially filled with air and are of low specific gravity.

The second class of materials to be found in certain barks, Douglas fir in particular, comprises a tough fibrous portion of the phloem known as bast fiber. This material is resistant to destruction by milling processes and is recovered in the form of individual hard fibers. For purposes of the instant disclosure, this material is referred to as bark fiber, and largely comprises a fraction having a coarseness intermediate between the cork fraction and the bark powder fraction. At low moisture content these fibers still tend to maintain their identity, even when subjected to the severe pulverizing action by which other portions of the phloem are reduced to powder.

A third class of materials is that herein classified as bark powder, being composed essentially of sieve tubes and other portions of the phloem exclusive of the bast fibers. This material readily disintegrates under the action of a ball mill at a moisture content at which the cork and bark fiber fractions are highly resistant to disintegration.

A method of separating and recovering these three materials is disclosed in an application for United States Letters Patent, Serial No. 556,097, filed September 27, 1944, now Patent No. 2,437,- 672 dated March 16, 1948, in the name of Herman W. Anway and having common assignee with the instant application. The present invention relates in general to the method therein disclosed and has as its object to provide an improved method of treating Duoglas fir bark to produce a pure bark fiber fraction.

In experimenting with the formulation of molding compounds employing bark products, it is found that each of the three classes of materials above mentioned imparts certain definite characteristics to articles molded therefrom, and that different characteristics may be obtained at will by using one or more of these materials in variant proportions in thermosetting molding compounds. In order to standardize and reproduce such formulations it is necessary, therefore, to separate these materials into relatively pure fractions. The present invention is concerned only with the fiber fraction. The bark powder and cork fractions are also produced and separated in the course of the process.

The method of the invention will now be described with reference to the single figure of the drawing, illustrating diagrammatically the functional steps in the process.

In the practice of the invention, bark may be stripped from logs and chopped or otherwise broken up to facilitate feeding the bark to a hammer mill or other suitable grinding equipment for converting the bark into a substantially uniform mass of bark particles. Prior to the grinding step it is desirable to wash the bark for removing therefrom particles of rotton bark, sand, dirt and other extraneous matter. During or after the washing operation the chopped bark is preferably screened, the screen openings being selected to pass and eliminate smaller particles of rotted bark and foreign materials. The principal purpose of the grinding step is to so reduce the particle size of the bark as to provide for control of its moisture content in a continuous process of producing the several bark fractions. Further purposes of the grinding step are to produce a particle size which is suitable for ball milling and which renders the bark readily transportable in pipes or ducts under blower action. Transportation in this manner also reduces the moisture content of the material as it moves along, so as to lessen the requirement for special drying equipment. It is recommened that the initial moisture content of the bark to be ground be from 30% to 80%, based on the weight of the dry bark.

In the grinding step the raw whole bark 10, washed clean of undesirable matter, is fed into a hammer mill 11 which breaks up the pieces of bark and discharges its product through a screen of approximately 1/4" mesh. The product of the hammer mill is, therefore, a mass of bark particles 12 of fairly uniform size and consisting approximately of the same constituents which compose the whole bark, although some of the phloem constituents will be found to be finely comminuted during the grinding operation. The bark is then in a suitable condition for the rapid adjustment of the moisture content of its several constituents for subsequent operations.

The first drying action occurs as the ground bark 12 is conveyed through ducts by the action of a hot air blower 13 which deposits it in a collection chamber 14. The collection chamber 14 may preferably be of the cyclone type wherein the stream of air from the blower 13 is separated from the flow of bark particles and exhausted to the atmosphere. This stream of heated air may, however, be conducted to the blower 13 for reuse in conveying and drying the bark.

From the collection chamber 14 the material is fed at a controlled feed rate onto an inclined vibrating screen 15 which may preferably be a 65 mesh screen having square openings .0082 inch on a side. The fine material which passes through the screen 15 comprises primarily bark powder, with which the present invention is not concerned. The removal of the fines in the first screening step increases the total output of the system by decreasing the load on the ball mill 16 which receives the material passing over the screen 15.

The ball mill 16 effects a controlled pulverizing action to finely comminute the friable portion of the material fed thereto, the time of treatment being in part determined by the moisture content of the material. The action of the ball mill breaks the bonds between sieve tubes and other portions of the phloem, and the cork, leaving bundles of bast fibers as a first stage in the comminution step. The time of treatment is adjusted, however, so that the bundles of bast fibers are broken up and yield individual fibers in the discharge of the ball mill along with the fine bark powder and coarser cork particles. In order to obtain the desired comminuting action in a reasonable time, the moisture content of the material leaving the collection chamber 14 must be such that any further drying action on the way to the ball mill 16 will produce the desired moisture content in the material by the time it arrives at the ball mill. Further drying takes place during milling, depending upon the time of treatment, and all these variables must be coordinated by sampling. On a typical production run the moisture content of the ground bark was found to be reduced by the drying system from 42.6% to 16.3%, oven dry basis. A moisture content of 15% to 25%, based on the dry weight of the bark, is desired.

The second screen 17 may also be a 65-mesh screen, and serves to remove the balance of the fines after the ball mill, thereby reducing the amount of material to be handled in the final screening steps. The product 18 passed through the second screen comprises primarily bark powder and may be combined with the product of the screen 15 for a useful purpose. The presence of fines and cork particles on the screen 17 congests the screen openings and prevents much of the bast fiber from passing through the screen, and the control of the feed rate to effect this mode of operation is an important consideration in the practice of the invention. The screen congestion however does not block the fines from passing therethrough.

The material passing over the screen 17 comprises cork particles of various sizes, and bast fibers. This mixture is then fed to larger mesh screen 19, which may preferably be a 28-mesh screen having square openings, .0232" on a side, for separating out the oversize +28-mesh material 20. The material which passes through the screen 19 contains the fiber fraction along with cork particles of a size which passes over the screen 17 and through the screen 19, this material constituting a relatively small proportion of the material handled in the initial stages of the process.

The material which passes through screen 19 is then fed onto a screen 21 which may preferably have the same size screen openings as screens 15 and 17. These units comprise woven wire screen material disposed in an inclined position and maintained in a taut condition by tension supporting means on the opposite side edges. A rigid bar is attached to the screen throughout its length along a medial line parallel to and midway between the tensioned side edges. This bar is actuated by a vibrator mechanism (not shown) to cause the screen to vibrate like a diaphragm at right angles to the plane of the screen.

The fibers constituting the ultimate fraction to be separated are rigid slender spindles having a length of roughly ten diameters, the diameter being somewhat less and the length being considerably greater than the screen openings of screens 15, 17 and 21 so that they will not pass through such a screen when they are lying flat. This accounts for the fact that all the material reaching the screen 21 has previously passed over the similar screens 15 and 17. On the screens 15 and 17 the feed rate is such that with the bulk of other material present relatively few of the fibers have the freedom necessary to up-end themselves and slip lengthwise through the openings to appear in the product 18.

A unique action takes place on the screen 21. With a slow feed rate and a relatively small amount of other material present to congest the screen openings, the ultimate individual fibers have sufficient freedom to respond to the vibration by dancing or jumping on the screen until they are perpendicular to the screening surface so that they can drop longitudinally through the openings, the fibers being too long to pass through when lying flat on the screen. The fine material having been eliminated by the screens 15 and 17, the end product 22 is a substantially pure fiber fraction.

In practice, the screens 19 and 21 may be combined to form a double deck screen unit producing oversize +28-mesh cork and fiber product 20, a coarse −28 +65-mesh cork and fiber product 23, and the −65-mesh pure fiber fraction 22. Average percentages of these three products at present recovered from the screens 19 and 21 in relation to the total products produced from the bark are as follows:

| | Per cent |
|---|---|
| +28 mesh material | 4.7 |
| +65 mesh material | 18.3 |
| −65 mesh fiber | 4.6 |

In an operation using apparatus such as is herein described, the −65 fiber fraction 22 is found to contain about 6% cork, or, in other words, this fraction is produced at 94% purity. For use in molding compounds and the like, this fraction may be considered as pure fiber, and is herein designated as pure or substantially pure fiber.

In order to obtain this degree of fiber purity in the product 22, much fiber is lost in the other products. The product 18 ordinarily contains from 20% to 35% fiber, product 20 contains from 35% to 60% fiber, and product 23 contains from 70% to 80% fiber. The disposition or subsequent treatment of these products is immaterial to the present invention, but they are all useful and important products obtained from the operation of a bark plant using the disclosed process. The amount of fiber lost in the products 18, 20 and 23 is subject to a certain amount of control by adjustment of the different variables affecting screen congestion conditions such as feed rate, screen vibration rate, and moisture content, as indicated by the analyses of periodic samplings.

The screens are all preferably of the type of vibrating screens hereinabove described, set in inclined positions, and screens 15, 17 and 21 may be identical. The angle of inclination and the vibration rate of each screen is adjusted in coordination with the feed rate and moisture content to produce optimum screen congestion conditions on the different screens as hereinabove described.

Averages of screen analyses of the −65 mesh fiber fraction from production runs disclose variation in particle sizes according to the following percentages:

| | Per cent |
|---|---|
| +65 mesh | 7.2 |
| −65 +100 mesh | 50.4 |
| −100 +200 mesh | 40.4 |
| −200 mesh | 0.9 |

In interpreting the above percentages, it must be remembered that the screening techniques in a sample analysis are entirely different from the screening actions accomplished by the automatic vibrator screens in a production plant of the type above described. Thus, it might be expected that the 7.2% of +65 mesh material would have been removed by the screen 21 so that it could not possibly get into the product 22, and it might be expected that the 0.9% of −200 mesh material would have been eliminated in the product 18, but such is not the case. Likewise, the −100 +200 mesh sub-fraction of 40.4% might be expected to appear in the product 18 rather than in the product 22. This apparent paradox, however, is explained by the fact that the fibers are crowded into haphazard positions in a mass of other material in passing over the screen 17, and in the short time allowed by the high feed rate they are so obstructed that they cannot drop freely through the screen, even though they may become upended from time to time. Because the fiber spindles are long and thin, it may be difficult to screen them through a 65-mesh screen even though they are physically capable of passing through a 100-mesh screen.

The ultimate individual fibers of Douglas fir bark are hard and tough and seem to suffer very little from the action of the hammer mill and ball mill. The main effect of this treatment upon the fiber is the breaking up of the fiber bundles to free the individual fibers. Fibers taken from the product 22 and viewed under the microscope appear to have a spindle shape, and vary in size from .016 to .051 inch in length and from .0016 to .0055 inch in diameter at the mid section. While they show very little evidence of the rough treatment they have received, some of the fibers do appear to have become broken into short lengths and some to be partly broken or bent, as a stick of wood may be broken without separating the two ends. The short ends of broken fibers are probably lost in the material 18, the longer ends segregating themselves with the rest of the fiber fraction 22. The bent or partly broken fibers would have very great difficulty, though, in passing through the screen 21, and would account for a part of the fiber component of the product 23. The amount of fiber breakage is, of course, subject to a certain amount of control in the ball mill 16. If the fiber bundles receive insufficient treatment in the ball mill they will not be broken up to free the ultimate individual fibers and the fiber bundles themselves will consequently pass over the screens 19 and 21 and appear in the products 20 and 23. On the other hand, if the moisture content were very low, and if the feed rate were so slow that the treatment in the ball mill was unduly prolonged, undoubtedly the amount of fiber breakage would be greatly increased. As has been previously stated, the success of the present process depends largely upon the coordination of different variables to obtain a novel screening action wherin the ultimate fiber fraction will pass over a particular screen in one step and then pass through an approximately identical screen in a subsequent step to achieve the substantially complete elimination of all other fractions. The term "ultimate fiber" is used to distinguish from bark fiber bundles.

No limitation is intended by reference to a particular type of apparatus for practicing the method of the invention, the same being limited only by the scope of the appended claims. In particular, applicant does not wish to be limited to the specific apparatus referred to for performing the grinding and comminuting steps, nor does applicant wish to be limited to specific sizes of screen openings or specific fiber dimensions, except as may be specified in certain claims. References in the specification to particular apparatus and screen openings are made by way of illustration only, to describe a preferred manner of carrying out the steps of the method in a continuous process best suited for a production plant. Other apparatus for grinding and comminuting may be devised by those skilled in the art and some variance may be made in the screening apparatus by properly coordinating the variables mentioned in the specification, and all such modifications and variations are included in the invention.

Having now described my invention and in what manner the same may be used, what I claim as new and desire to protect by Letters Patent is:

1. The method of producing substantially pure bark fiber comprising dry screening in a plurality of successive screening operations finely divided bark containing loose ultimate fibers having lengths substantially greater than their diameters, the screens employed in the first and final screening operations having mesh openings of a size greater than the diameter and less than the length of the fibers, maintaining a congested layer of material on the screen during the first screening operation to restrain the fibers from passing through the screen, maintaining a relatively thin layer of material on the screen during the final screening operation and vertically vibrating the material in said final screening operation to up-end the fibers and permit them to pass through the screen while rejecting oversize material.

2. The method of producing substantially pure bark fiber from finely divided bark containing loose ultimate Douglas fir fibers having lengths substantially greater than their diameters, comprising dry screening said finely divided bark in successive screening operations, the screen employed in at least two of said screening operations having mesh openings of a size greater than the diameter and less than the length of the fibers, maintaining a congested layer of material on the screen during the first screening operation to restrain the fibers from passing through the screen while removing the fines, maintaining a relatively thin layer of material on the screen during a subsequent screening operation and vertically vibrating the material in said subsequent screening operation to up-end the fibers and permit them to pass through the screen while rejecting oversize material.

3. The method of producing substantially pure bark fiber from a mixture of whole Douglas fir bark comminuted so as to consist of cork particles, ultimate fibers having lengths substantially greater than their diameters, and a finely pulverized non-fibrous portion of the phloem, comprising successively passing said comminuted mixture in the dry over screens having mesh openings of a size slightly greater than the diameter but substantially less than length of said fibers, feeding the material to a first screen at a rate to maintain a congested layer of material thereon to restrain the fibers from passing through said screen while removing the fines, feeding the overs to a subsequent screen at a rate to maintain a relatively thin layer of material thereon to enable freedom of movement of the loose fibers, and vertically vibrating the material on said subsequent screen to cause said fibers to up-end and pass through said screen while the oversize fraction of cork particles is being rejected.

4. In the method of producing substantially pure Douglas fir bark fiber from a finely comminuted bark mixture containing loose ultimate Douglas fir fibers having lengths of from .016 to .051 inch and diameters of from .0016 to .0055 inch, the steps of successively dry screening said mixture over two screens having approximately .0082 inch mesh openings, the first screening step being conducted while maintaining a congested layer of material thereon to restrain the fibers from passing therethrough while removing the fines, the second screening step being conducted while maintaining a relatively thin layer of material thereon to permit the fibers freedom of movement, and actuating said second screen to cause said fibers to up-end and pass therethrough while rejecting oversize material as overs.

5. The method of producing substantially pure bark fiber from finely divided bark containing loose ultimate fibers having lengths substantially greater than their diameters comprising dry screening said finely divided bark in three successive screening operations, each of the screens employed in the first and third operation having mesh openings of a size greater than the diameter and less than the length of the fibers and the screen employed in the second operation having mesh openings of coarser size, maintaining a congested layer of material on the screen during the first screening operation to restrain the fibers from passing through said first screen, passing the overs from the first screen to the second screen to reject during the second operation a coarse fraction of material while passing therethrough a substantial portion of the fibers, maintaining the throughs from said second screening operation in a relatively thin layer on the screen during the third screening operation and vertically vibrating the material in said third screening operation to up-end the fibers and permit them to pass through said third screen while rejecting oversize material.

6. The method of producing substantially pure bark fiber from finely divided whole Douglas fir bark containing loose ultimate fibers having lengths substantially greater than their diameters, comprising dry screening said finely divided bark in a plurality of successive screening steps, the screen employed in the first and final steps having mesh openings of a size greater than the diameter and less than the length of the fibers and the screen employed in an intermediate step having a mesh opening of coarser size, maintaining a congested layer of material during said first screening step to restrain the fibers from passing through the screen, passing the overs from said first screening step to the screen employed in said intermediate step to remove a coarse fraction of material while passing therethrough a substantial portion of the fibers, maintaining the throughs from said intermediate screening step in a relatively thin layer on the screen in said final screening step and vertically vibrating the material in said final screening operation to up-end the fibers and permit them to pass through the screen while rejecting oversize material.

7. The method of producing substantially pure bark fiber from a mixture of finely divided Douglas fir bark containing cork particles, loose ultimate fibers having lengths of from .016 to .051 inch and diameters of from .0016 to .0055 inch, and a finely pulverized portion of the phloem, comprising successively passing said finely divided mixture in the dry over a plurality of screens, the first and final screens being 65 mesh and an intermediate screen being 28 mesh, maintaining a congested layer of material on the first screen to restrain the fibers from passing through said screen while removing the fines, passing the overs from said first screen to said intermediate screen to reject a coarse fraction of cork particles, maintaining the throughs from said second screen in a relatively thin layer on the final screen and vertically vibrating the material on said final screen to up-end the fibers and permit them to pass through said screen while rejecting oversize material.

ROBERT D. PAULEY.

REFERENCES CITED

The following references are of record in the file of this patent:

UNITED STATES PATENTS

| Number | Name | Date |
|--------|------|------|
| 77,829 | Miller | May 12, 1868 |
| 378,516 | Oliver | Feb. 28, 1888 |

(Other references on following page)

UNITED STATES PATENTS

| Number | Name | Date |
|---|---|---|
| 1,226,263 | Rustin | May 15, 1917 |
| 1,455,762 | Howard | May 15, 1923 |
| 1,870,166 | Bond | Aug. 2, 1932 |
| 2,058,959 | Denning | Oct. 27, 1936 |
| 2,225,909 | Gruender | Dec. 24, 1940 |
| 2,238,454 | Steele | Apr. 15, 1941 |
| 2,286,643 | Phillips | June 16, 1942 |
| 2,311,813 | Beck | Feb. 23, 1943 |
| 2,320,755 | Smith | June 1, 1943 |
| 2,361,946 | Johnson | Nov. 7, 1944 |

FOREIGN PATENTS

| Number | Country | Date |
|---|---|---|
| 25,198 | Netherlands | Sept. 16, 1931 |
| 280,721 | Great Britain | Nov. 24, 1927 |

OTHER REFERENCES

Industrial & Engineering Chemistry, Aug. 1944, pp. 759–764.

Wise—Wood Chemistry, Reinhold Pub. Co., N. Y., 1944, pp. 9–10.